Figure 1:
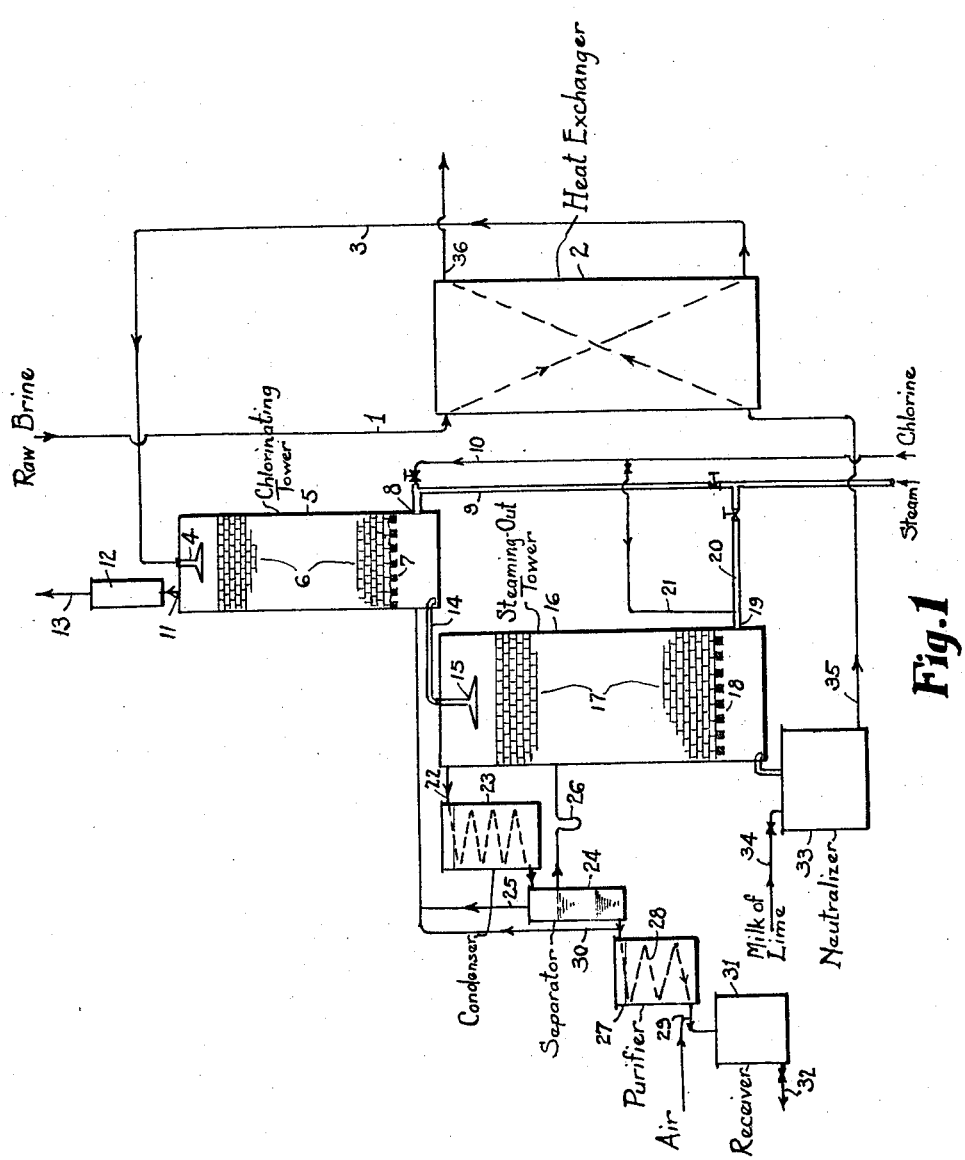

March 21, 1933.   I. F. HARLOW ET AL   1,902,801
CONTINUOUS PROCESS OF PREPARING LIQUID BROMINE Filed April 3, 1930

INVENTORS
Ivan F. Harlow, Ivan A. Kenaga
BY  and Grayton F. Dressel
Thomas Griswold, Jr.
ATTORNEY Patented Mar. 21, 1933

1,902,801

UNITED STATES PATENT OFFICE

IVAN F. HARLOW, IVAN A. KENAGA AND GRAYTON F. DRESSEL, OF MIDLAND, MICHIGAN, ASSIGNORS TO THE DOW CHEMICAL COMPANY, OF MIDLAND, MICHIGAN, A CORPORATION OF MICHIGAN

CONTINUOUS PROCESS OF PREPARING LIQUID BROMINE

Application filed April 3, 1930. Serial No. 441,210.

The present invention has reference to processes for extracting bromine from dilute aqueous solutions, e. g. natural brines and bitterns, wherein it is contained in combined form chiefly as bromide, and has particular regard to a continuous process for the separation and recovery of bromine in liquid form therefrom.

A well known process of the character in hand consists in flowing the bromide solution over a tower filled with a suitable packing material wherein the solution is simultaneously treated with chlorine and heated to boiling by direct steam. The chlorine liberates the bromine from combination and the latter is boiled out of the aqueous solution, the vapors being then condensed and the liquid bromine separated from the aqueous distillate. Various modifications and improvements of the foregoing procedure have been made which relate to heat economy and the conservation of residual values in tail liquors, aqueous distillates, etc., but in all cases the methods of procedure hitherto employed have been subject to certain limitations and disadvantages from a practical operating standpoint. Among such disadvantages, it is necessary to use chlorine substantially of the purity of commercial liquid chlorine for treating the bromide solution, since the presence of an appreciable proportion of air admixed with the chlorine interferes with the condensation of liquid bromine from the distillate. For instance, when a 60 to 70 per cent. chlorine gas is employed, the volume of air present therein may entirely prevent the condensation of any liquid bromine at temperatures readily attainable by usual cooling means. This difficulty cannot be overcome by refrigerating the distillate to low temperatures, inasmuch as solid crystals of bromine hydrate will be formed at temperatures below about 7° C. and will tend to obstruct the condenser, while in any event a greater or less proportion of bromine in the distillate would be converted into a practically non-condensable fog. Another disadvantage is that some of the bromine first liberated recombines with water to form hydrobromic acid which remains in solution in the tail liquors, even though an excess of chlorine be introduced into the extraction tower. When the original solution has a very low bromine content, which in practice is almost always the case, the loss in the tail liquors may amount to a considerable proportion of the total bromine. While such tail liquors may be re-treated to recover a portion of the residual bromine content, such practice obviously is not economical. Still another disadvantage is that the liquid bromine produced as the foregoing contains an appreciable amount of chlorine and must be further purified to reduce the chlorine content to an allowable figure.

We have now found that, by chlorinating the bromide solution in one tower at a temperature materially below the boiling point thereof and then vaporizing the liberated bromine with steam in a separate tower according to a suitably controlled procedure hereinafter described in detail, we are enabled (1) to utilize for the first step chlorine of usual purity, e. g., 50 to 90 per cent., such as may be obtained directly from any of the various types of electrolytic chlorine cells; (2) to effect an extraction of as much as 95 per cent. or more of the bromine from brines of extremely low bromine content at a single passage; and (3) to condense substantially all of the liberated bromine directly as liquid by usual cooling means. We have further found that the liquid bromine may be simultaneously purified to a chlorine content as low as 0.1 per cent. by simple means most advantageously performed in conjunction with the principal process. The invention, then, consists of the combination of steps hereinafter fully described and pointed out in the claims, the annexed drawing and following description setting forth in detail various ways in which the principle of the invention may be used.

In said annexed drawing:—

The single figure shows diagrammatically a preferred arrangement of apparatus adapted for carrying out our improved process.

Referring to the drawing, the cold raw brine or other solution containing the bromine in combined form as bromide enters the system through pipe 1 and passes first through a heat-exchanger 2, which may be of any desired type, in which it is preheated by interchange of heat with the hot debrominated brine leaving the system. The preheated brine, the temperature of which has been raised to as high as 80° to 85° C. under properly controlled conditions, is conducted through pipe 3 to distributer 4 located at the top of chlorinating tower 5. Tower 5 may be constructed of any suitable corrosion resistant material, such as stoneware or the like, and is provided with a body of suitable acid-proof packing material 6 supported therein by grating 7. The hot brine flows downwardly over the packing 6 wherein it is intimately contacted with an ascending current of chlorine. The chlorine, and, if necessary, sufficient steam to maintain the temperature of the brine at about the aforementioned figure are admitted at inlet 8 through pipe connections from the steam and chlorine mains 9 and 10, respectively. The bromine is liberated by the action of the chlorine, but in the amount normally present remains substantially dissolved in the aqueous medium. Any air which was introduced along with the chlorine passes off through vent 11, which may be connected with an absorber 12 wherein traces of bromine in the vent gases are absorbed by contact with metallic iron, caustic alkali or other suitable medium, and the purified vent gases are discharged into the air through pipe 13.

The hot treated brine holding the liberated bromine in solution overflows from the base of tower 5 through liquid sealed outlet pipe 14 and is conveyed to distributer 15 at the top of steaming-out tower 16, similar in form and construction to tower 5 and likewise provided with a body of packing material 17 supported by grating 18. Steam is admitted at inlet 19 through pipe 20 in amount sufficient to heat the bromine-containing brine to about the boiling point in the lower portion of tower 16, while a certain amount of additional chlorine is introduced at the same time through pipe 21 to decompose any hydrobromic acid that may have been formed by combination of bromine and water in accordance with the equation:— $2Br_2 + 2H_2O \rightarrow HBr + O_2$. Free bromine is vaporized and blown out of the solution by the steam as the heated brine descends through the packing 17 of tower 16 and admixed with water vapor rises in the tower through the interstices of the packing against the downflowing stream of the solution, thereby being subjected to a refluxing and fractionating action while the temperature of the vapors is progressively reduced to a point materially below that of the boiling solution. In this way a portion of the water vapor is condensed, resulting in a concentration of the bromine vapor, and such concentrated vapors finally pass out through exit passage 22 through which they are conducted to a water-cooled condenser 23 and therein condensed. The condenser 23 is connected with a separator 24 wherein the liquid bromine separates from the condensed water and uncondensed gases and vapors. The vapors are led off through pipe 25 and returned to the base of chlorinating tower 5. The water layer from separator 24, which holds some bromine in solution, is returned to steaming-out tower 16 through trapped return pipe 26. Liquid bromine flows from the bottom of separator 24 into purifier 27 which may consist of a glass or stoneware coil 28 of sufficient diameter to leave a relatively large vapor space therein above the surface of the stream of liquid bromine. The coil 28 is water-cooled to maintain a suitably low temperature therein, and air is admitted under slight pressure at inlet 29 near the lower end thereof. The small amount of chlorine which may be contained in the bromine is largely vaporized during passage through the purifier coil owing to its relatively much higher vapor pressure than that of the bromine, and is carried away accompanied by some bromine vapor in the current of air which is conducted via pipe 30 connecting with return pipe 25 leading to the base of chlorinating tower 5. The purified liquid bromine flows into receiver 31 whence it may be withdrawn through discharge pipe 32.

The hot debrominated brine, which now has an acid reaction, flows from the base of tower 16 into neutralizer tank 33 wherein it is treated with milk of lime or other suitable base introduced through pipe 34. It is advisable to neutralize the hot brine to avoid corrosion of iron pipes, pumps, etc. in the subsequent handling thereof. The hot neutralized brine is then conveyed by pipe 35 to the heat exchanger 2 wherein it passes in heat exchange relation with the cold raw brine, and is then finally discharged from the system through pipe 36.

By operating in conformity with the procedure just described it is feasible to employ a more or less dilute chlorine gas such as is ordinarily obtained from commercial electrolytic chlorine cells, e. g. a gas containing from 90 per cent. to as low as 50 per cent. chlorine or even less, whereas in processes hitherto practiced for the simultaneous chlorination of the bromide solution and steaming out of the bromine in a single step it has been necessary to employ liquid chlorine for the reasons already explained. In our improved process the air content of the dilute chlorine is vented in the first stage from the chlorinating tower while the bromine remains in the aqueous solution leaving the tower. The vapors distilled out of the steaming-out tower in the second stage are largely condensable with usual cooling means and the content of permanent gases therein is very low, hence an almost complete recovery of the bromine in liquid form is secured directly.

The quantity of chlorine required to liberate all of the bromine and to enable the latter to be steamed out without loss through recombination varies somewhat according to the nature of the brine or other solution to be treated. Natural brines commonly contain dissolved iron salts in a reduced (ferrous) condition, which are unavoidably oxidized in the chlorinating step and thereby increase the consumption of chlorine. A slight excess of chlorine is also required to counteract the tendency of the liberated bromine to be converted to hydrobromic acid by reaction with water. Working with the type of natural brine occurring in the Midland, Michigan, district, which contains about 0.13 to 0.17 per cent. bromine, we have found that an excess of from about 70 to 80 per cent. of chlorine is needed over that theoretically required to set free all of the bromine. Not all of the chlorine is to be added in the chlorinating tower, however, as we have found that a small proportion must be added in the steaming-out tower in order to reduce to a minimum the bromine content of the effluent from that tower. In practice we have found it advantageous to introduce about 70 to 80 per cent. of the total chlorine used into the chlorinating tower, and the balance into the steaming-out tower, although these proportions may be varied more or less.

When treating a brine of the aforesaid bromine concentration a suitable working temperature for the chlorinating tower is between 75° and 85° C., whereat the bromine is quickly and completely liberated from chemical combination but remains substantially completely dissolved in the aqueous solution. The raw brine is preferably to be preheated to such temperature before introduction into the chlorinating tower, and, if necessary, a small amount of steam is injected into the tower to maintain the temperature, although under usual conditions this will not be required. The bulk of the steam consumed in the process is used in the steaming-out tower, wherein the brine is to be heated near to the point of active ebullition, the actual temperature attained being dependent upon its content of dissolved salts and usually varying from 100° to about 105° C. or more. Low pressure steam, such as engine exhaust steam, is suitable for the purpose. The hot debrominated brine leaves the base of the steaming-out column at approximately the boiling temperature, and, after neutralizing, may be used to supply all of the heat required to preheat the raw brine by suitably proportioning and regulating the heat exchange in exchanger 2.

As already indicated, the steaming-out tower is operated so that the lower portion thereof constitutes a vaporizing zone and the upper portion a refluxing and fractionating zone. The temperature gradient within the tower varies from about 100° C. or slightly higher at the bottom to about the temperature of the treated brine introduced at the top thereof. We have found that the temperature of the vapors issuing from the top of the tower should be maintained between about 80° and 90° C., preferably between about 82° and 85° C., in order to obtain the highest recovery of liquid bromine in the condenser. Operating in this way, much of the water vapor is condensed and refluxed within the tower and a stronger bromine vapor passes to the condenser. If the temperature of the exit vapors falls below 80 some of the bromine may be reabsorbed and refluxed in the tower, while if the temperature is allowed to rise above about 90° C. either an excessive amount of bromine will pass through the condenser without being condensed, or the capacity of the condenser must be increased to effect a satisfactory condensation. In either case a loss of efficiency is entailed which furthermore gives rise to operating difficulties.

The mixture of bromine and water condensed in condenser 23 separtes in separator 24 into a lower layer of crude liquid bromine containing a small amount of chlorine and an upper layer consisting of a saturated aqueous solution of bromine, while the uncondensed gases are returned to the chlorinating tower as already shown to conserve the bromine content thereof. The aqueous bromine solution is continuously returned to the steaming-out tower, thus automatically providing for the recovery of the bromine therein. The crude liquid bromine, which normally contains from 2 to 5 per cent. chlorine, is readily purified by treatment with air in purifier 27 to reduce the chlorine content to as low as 0.1 per cent. or less, while the return of the chlorine and bromine laden air from the purifying step to the chlorinating tower safeguards against any possibility of losses in that step.

The entire process is thus seen to operate uninterruptedly resulting in the continuous production of a highly pure liquid bromine while the hot debrominated brine is employed for preheating the raw brine. The recovery of bromine from a brine of the type herein referred to may be consistently held at 95 per cent. or more. The economy of the process is clearly evidenced in the use of dilute chlorine gas for liberating the bromine and of low pressure steam for the heating. The process is carried out in apparatus constructed throughout of readily available materials and presents no serious problems of preventing corrosion.

In conclusion it is noted that the action of steam in the steaming-out tower apparently consists both in heating the solution to vaporize the bromine therein and in mechanically blowing the bromine vapors out of the solution and carrying them away. Such mechanical action may be exerted by steam generated in situ as well as by steam passed into the solution; the effectiveness of generated steam being greatest when the solution is boiling, while steam introduced under pressure may accomplish an equivalent result at temperatures somewhat below the boiling point of the solution. Consequently, external heating of the solution in the steaming-out tower by means of steam coils or the like may be employed to heat the same to boiling although less desirably than by the direct injection of steam, in which latter case it is sufficient merely to heat the solution to a temperature near the boiling point. In the following claims the term "steaming" denotes the combined effect of steam in vaporizing the bromine by the heat supplied and expelling the vapors from the hot aqueous solution.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. The process of extracting bromine from bromide-containing solutions which comprises treating such solution with an air-chlorine mixture at a temperature materially below the boiling point thereof whereat the liberated bromine remains substantially dissolved, steaming the treated solution in a separate stage to expel bromine as vapor therefrom, condensing the vapors and separating liquid bromine from the aqueous distillate.

2. The process of extracting bromine from bromide-containing solutions which comprises treating such solution with an air-chlorine mixture at a temperature between about 70° and 90° C., separating residual undissolved gases, steaming the treated solution to expel bromine as vapor therefrom, condensing the vapors and separating liquid bromine from the aqueous distillate.

3. The process of extracting bromine from bromide-containing solutions which comprises preheating such solution to a temperature between about 70° and 90° C., treating with an air-chlorine mixture, separating residual undissolved gases, steaming the treated solution to expel bromine as vapor therefrom, condensing the vapors and separating liquid bromine from the aqueous distillate.

4. The process of extracting bromine from bromide-containing solutions which comprises preheating such solution to a temperature between about 70° and 90° C., treating with an air-chlorine mixture, separating residual undissolved gases, steaming the treated solution to expel bromine as vapor therefrom, condensing the vapors, separating liquid bromine from the aqueous distillate and employing the hot debrominated solution for preheating the original solution in the first step.

5. The process of extracting bromine from bromide-containing solutions which comprises preheating such solution to a temperature between about 70° and 90° C., treating the preheated solution with chlorine in amount slightly in excess of that theoretically required to oxidize reduced compounds and liberate all of the bromine, separating residual undissolved gases, steaming the treated solution to expel bromine as vapor therefrom while adding thereto a further amount of chlorine sufficient to liberate any recombined bromine therein, condensing the vapors, separating liquid bromine from the aqueous distillate, returning the latter to the steaming-out step and employing the hot debrominated solution for preheating the original solution in the first step.

6. The continuous process of producing liquid bromine of high purity from aqueous solutions containing a bromide in relatively small amount which comprises preheating such solution to a temperature between about 70° and 90° C., treating the preheated solution with chlorine in amount slightly in excess of that theoretically required to oxidize reduced compounds and liberate all of the bromine, separating residual undissolved gases, steaming the treated solution to expel bromine as vapor therefrom while adding thereto a further amount of chlorine sufficient to liberate any recombined bromine therein, condensing the vapors, separating liquid bromine from the aqueous distillate, returning the latter to the steaming-out step, purifying the liquid bromine by flowing the same in contact with a current of air, returning the exit gases from the purification step to the chlorinating step and employing the hot debrominated solution from the steaming-out step for preheating the original solution in the first step.

7. The process of extracting bromine from bromide-containing solutions which comprises preheating such solution to a temperature between about 70° and 90° C., treating with an air-chlorine mixture, separating residual undissolved gases, steaming the treated solution to expel bromine as vapor therefrom, refluxing the vapors at a temperature between 80° and 90° C., condensing the residual vapors and separating liquid bromine from the aqueous distillate.

8. The process of extracting bromine from bromide-containing solutions which comprises preheating such solution to a temperature between about 70° and 90° C., treating with an air-chlorine mixture, separating residual undissolved gases, steaming the treated solution to expel bromine as vapor therefrom, refluxing the vapors at a temperature between 80° and 90° C., condensing the residual vapors, separating liquid bromine from the aqueous distillate and employing the hot debrominated solution for preheating the original solution in the first step.

9. The process of extracting bromine from bromide-containing solutions which comprises preheating such solution to a temperature between about 70° and 90° C., treating the preheated solution with chlorine in amount slightly in excess of that theoretically required to oxidize reduced compounds and liberate all of the bromine, separating residual undissolved gases, steaming the treated solution to expel bromine as vapor therefrom while adding thereto a further amount of chlorine sufficient to liberate any recombined bromine therein, refluxing the vapors at a temperature between 80° and 90° C., condensing the residual vapors, separating liquid bromine from the aqueous distillate, returning the latter to the steaming-out step and employing the hot debrominated solution for preheating the original solution in the first step.

10. The continuous process of producing liquid bromine of high purity from aqueous solutions containing a bromide in relatively small amount which comprises preheating such solution to a temperature between about 70° and 90° C., treating the preheated solution with chlorine in amount slightly in excess of that theoretrically required to oxidize reduced compounds and liberate all of the bromine, separating residual undissolved gases, steaming the treated solution to expel bromine as vapor therefrom while adding thereto a further amount of chlorine sufficient to liberate any recombined bromine therein, refluxing the vapors at a temperature between 80° and 90° C., condensing the residual vapors, separating liquid bromine from the aqueous distillate, returning the latter to the steaming-out step, purifying the liquid bromine by flowing the same in contact with a current of air, returning the exit gases from the purification step to the chlorinating step, and employing the hot debrominated solution from the steaming-out step for preheating the original solution in the first step.

11. The process of extracting bromine from aqueous bromide solutions which comprises preheating such solution to a temperature between about 70° and 90° C., treating the preheated solution with chlorine in amount slightly in excess of that theoretically required to oxidize reduced compounds and liberate all of the bromine present, separating residual undissolved gases, steaming the treated solution to expel bromine as vapor therefrom while adding thereto a further amount of chlorine sufficient to liberate any recombined bromine therein, condensing the vapors and separating liquid bromine from the aqueous distillate.

12. The process of extracting bromine from aqueous bromide solutions which comprises preheating such solution to a temperature between about 70° and 90° C., treating the preheated solution with chlorine in amount slightly in excess of that theoretically required to oxidize reduced compounds and liberate all of the bromine present, separating residual undissolved gases, steaming the treated solution to expel bromine as vapor therefrom while adding thereto a further amount of chlorine sufficient to liberate any recombined bromine therein, refluxing the vapors at a temperature between 80° and 90° C., condensing the residual vapors and separating liquid bromine from the aqueous distillate.

Signed by us this 28 day of March, 1930.
IVAN F. HARLOW.
IVAN A. KENAGA.
GRAYTON F. DRESSEL.